United States Patent [19]
Pleier

[11] 3,910,389
[45] Oct. 7, 1975

[54] CONTROL FOR APPLYING BRAKE DURING TRANSMISSION SHIFTS

[75] Inventor: Walter J. Pleier, Bristol, Pa.

[73] Assignee: Eaton Corporation, Cleveland, Ohio

[22] Filed: Apr. 2, 1974

[21] Appl. No.: 457,319

[52] U.S. Cl. .............................. 192/4 C; 137/596.15
[51] Int. Cl.² ........................................ B60K 29/02
[58] Field of Search ................................... 192/4 C

[56] References Cited
UNITED STATES PATENTS

| | | | |
|---|---|---|---|
| 2,990,728 | 7/1961 | Grenier | 192/4 C X |
| 3,386,523 | 6/1968 | Ruhl | 192/4 C |
| 3,400,790 | 9/1968 | Ruhl et al. | 192/94 X |
| 3,458,018 | 7/1969 | Shore | 192/4 C |
| 3,540,556 | 11/1970 | Snoy et al. | 192/4 C |
| 3,543,891 | 12/1970 | Mathers | 192/4 C X |
| 3,606,906 | 9/1971 | Shore | 192/4 C X |
| 3,692,160 | 9/1972 | Hilpert | 192/4 C |

*Primary Examiner*—Benjamin W. Wyche
*Attorney, Agent, or Firm*—Teagno & Toddy

[57] ABSTRACT

An automatic vehicle brake control system is disclosed which actuates a vehicle brake system in response to a transmission shift by a vehicle operator, as between a forward and reverse vehicle direction. The control system automatically provides for engaging the vehicle brakes upon the initiation of the transmission shift by the operator. The vehicle brakes are not released until a safe shifting speed is reached by the vehicle to allow the actual vehicle transmission shift to be accomplished safely. Structurally, the control system has an anti-plug valve connected to a manually operated transmission control valve and to a brake system control valve. The switching of the transmission control valve actuates the anti-plug valve which provides an adjustable time delay between actuation of the actual vehicle transmission shift corresponding to the shift indicated by the transmission control valve. During this time delay, the anti-plug valve causes the vehicle brakes to be actuated to slow down or stop the vehicle thereby preventing inertial shock to the vehicle transmission.

7 Claims, 3 Drawing Figures

CONTROL FOR APPLYING BRAKE DURING TRANSMISSION SHIFTS

FIELD OF THE INVENTION

1. Background of the Invention

This invention relates to control systems generally and particularly to a vehicle control system which automatically provides engagement of the vehicle brake during a transmission shift by the vehicle operator as between forward and reverse vehicle direction.

2. Description of the Prior Art

It is common for operators of vehicles such as lift trucks and shovel loaders to shift the transmission control directly between forward and reverse without applying the brakes or coming to a stop. This operation puts the reversal of the inertial load of the vehicle along with whatever weight it is carrying directly to the drive train. This inertia reversal results in early failure of vehicle components such as axle shafts, differentials, clutch plates, or any other members which might comprise the weakest link of the drive train. Operation of the vehicle in this manner is called "plugging". Attempts to prevent plugging have propagated control systems using gates in the shift pattern to prevent direct motion from forward control position to reverse and vice versa. Other control systems have employed a sensor to detect gear speed and prevent direction change before gear speed has been lowered to a predetermined level either by dumping clutch oil pressure to a tank or by controlling a mechanical blocking device in the shift linkage. Still other control systems employ manifold vacuum and atmospheric pressure to control the duration time of the change of direction so that the reversal of all the gears and shafts is gentle and not abrupt. As such, these known systems are prone to early failure and require time consuming and expert repair. Furthermore, none of these known systems provide a variable braking period during which the actual transmission shift is adjustably delayed to allow the control to match the vehicle to which it is to be adapted.

One specific example of the above known prior art control systems is disclosed in U.S. Pat. No. 3,458,018 issued to Daniel B. Shore. This system utilizes a dump valve which is normally balanced by a run detector pump and which is unbalanced by a selector valve which indicates a desired vehicle transmission shift. In the unbalanced state the dump valve actuates the vehicle brakes. Braking is continued until the vehicle stops at which time the dump valve is again centered. The Shore reference makes no provision for a controlled bleed for the dump valve to provide a variable braking period to the vehicle.

Another specifically known prior art control system is disclosed in U.S. Pat. No. 3,386,523 issued to Charles A. L. Ruhl. In this system, transmission shifting between forward and reverse vehicle direction is delayed for a set time sufficient to drain a brake circuit. The delay in shifting is accomplished by a check valve which resists draining of a transmission valve until the brake circuit is drained. Again, there is no provision for an adjustable application of actual transmission shifting or braking during the transmission shift.

From the above discussion we can see that the known prior art control systems have no suggestion of a control system for adjustably braking a vehicle during a directional transmission shift. Nor is there any suggestion of a control system which utilizes an integrated anti-plug valve to adjustably control the shifting time between transmission shifts, nor of a system adjustment valve to control the application of the vehicle brakes during the transmission shift delay. These problem areas and others associated with the known prior art systems are solved by the present invention.

SUMMARY OF THE INVENTION

The present invention provides a simple more reliable control system for automatically braking a vehicle during a transmission shift between vehicle directions. This control system utilizes an integrated anti-plug valve to delay the actual engagement of a vehicle transmission to a reversed vehicle direction until the vehicle has been braked sufficiently from continuing in its initial direction. To accomplish this, the anti-plug valve is connected to a transmission shift valve, a vehicle brake system, and a transmission clutch. Whenever the shift valve is moved to actuate a change in vehicle direction, it establishes a control signal in the anti-plug valve. The anti-plug valve provides a pressure signal to the brake system to brake the vehicle and after a time lapse, during which the vehicle is braked, the anti-plug valve actuates the clutch to engage the vehicle transmission in the direction indicated by the shift valve. The time delay provided between indicated and actual transmission shift may be varied by an adjustable needle valve in the anti-plug means.

The anti-plug valve assembly includes a cylindrical enclosure within which a piston assembly moves in response to input signals applied to the enclosure. The cylindrical enclosure has formed therein a pair of output passages as well as a vent passage. The piston assembly when moving in the cylindrical enclosure moves from a first position wherein it blocks the vent and the first output passage to a second position wherein the first output is connected to the vent passage and the second output is connected to the input signal provided to the cylindrical enclosure. As applied to the present control system, the anti-plug valve allows the vehicle brakes to remain actuated in the first position until their signal is vented and the input signal is applied to the clutch in the second position. The time required for the piston assembly to move from the first to the second position may be varied by an adjustable valve which controls the bleeding of the cylindrical enclosure.

From the above it may be seen that one feature of the present invention is to provide a control system which will delay the actual engagement of a vehicle transmission for an adjustable time period during which the vehicle brakes are applied to brake the vehicle.

Another feature of the present invention is to provide an integrated anti-plug valve assembly which provides a number of sequenced output signals in response to an input signal.

Yet another feature of the present invention is to provide an integrated anti-plug valve assembly which provides an adjustable time delay between sequenced outputs.

These and other features of the present invention will become apparent upon a review of the following detailed description of the invention considered in conjunction with the drawings.

DESCRIPTION OF THE PREFERRED EMBODIMENT

Figure 1:
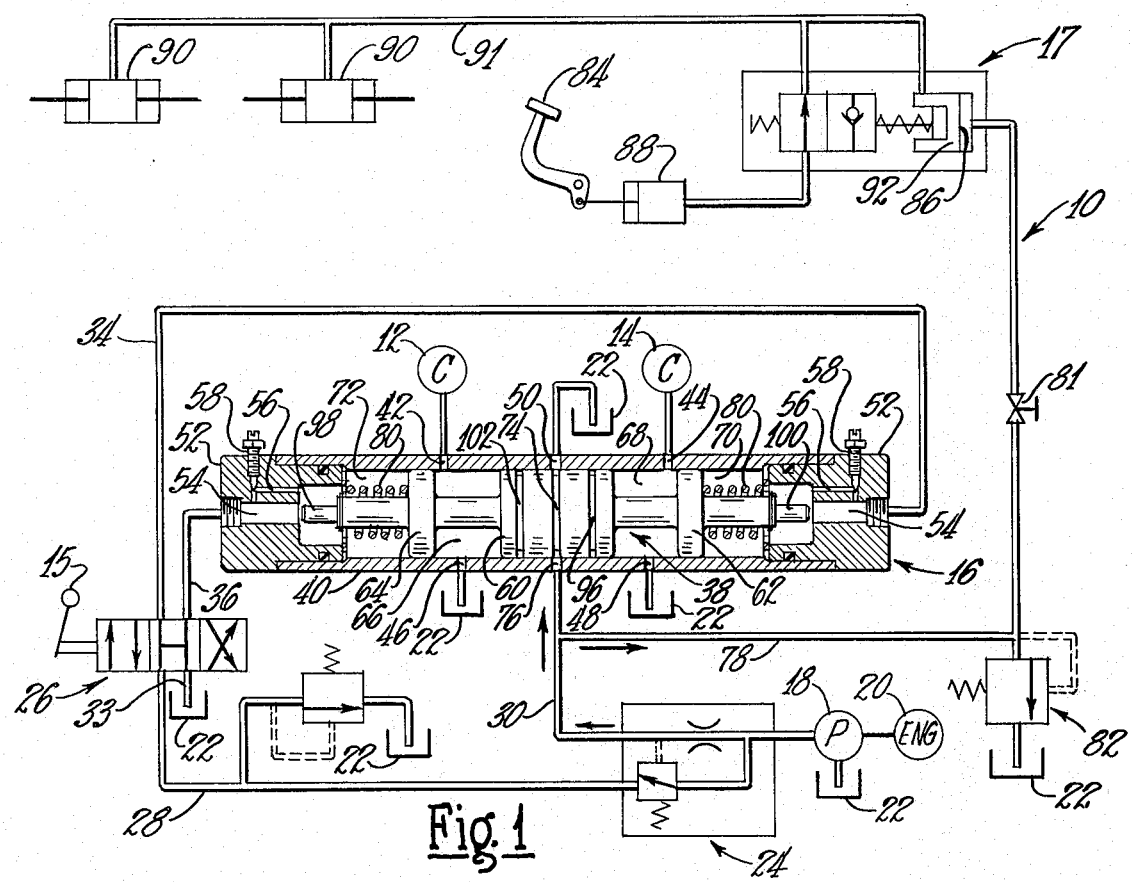
FIG. 1 is a schematic drawing of the vehicle control system of the present invention.

Referring now to the drawings, it will be noted that they disclose a preferred rather than an exclusive embodiment of the present invention. As best seen in FIG. 1, the present invention provides a control system 10 which delays the actuation of an actual vehicle transmission shift through clutch signals 12 and 14 in response to an operator shift of a shift handle 15 between desired vehicle directions such as forward and reverse. This time delay is provided by an anti-plug valve assembly 16. During this time delay, the vehicle is automatically braked by a brake system 17 from its initial speed in a first direction to a slower speed or to a complete stop before the actual transmission shift is completed. This allows the vehicle transmission to be shifted between forward and reverse directions without placing an inertia reversal load on the vehicle drive train.

The control system 10 is powered by a pump 18 which is driven by the vehicle engine 20. The pump 18 draws fluid from a reservoir 22 and conducts it to an inlet of a divider valve 24 and therefrom through a pair of divider valve outlets to the rest of the control system 10. The divider valve is constructed to conduct the fluid to a transmission shift control valve 26 along a first branch line 28 and from the first divider valve outlet to conduct the fluid from the second divider valve outlet to the anti-plug valve assembly 16 and the brake system 17 along a second branch line 30. As will be explained more fully later, the fluid conducted along the second branch line 30 will either pressurize the brake system 17 or pass through the anti-plug valve 16 depending upon the condition of the anti-plug valve 16. The transmission control valve 26 will either dump the fluid to reservoir 22 along line 33 or will conduct it to the anti-plug valve 16 along lines 34 or 36 depending upon the position of the shift handle 15.

The transmission shift control valve 26 is shown in the neutral position with the fluid from lines 28, 34, and 36 being connected to reservoir 22. The anti-plug valve 16 is similarly in the neutral position. When the shift handle is moved by the vehicle operator to indicate either forward or reverse desired vehicle direction, either line 34 or line 36 will be connected to the pressure line 28. The remaining line will be connected to reservoir 22. This allows either side of the anti-plug valve to be pressurized with the other side being vented. An integral valve spool 38, mounted inside the anti-plug valve, is thereby moved in two opposite directions depending upon the setting of the shift handle 15 to actuate either the forward clutch 12 or the reverse clutch 14.

The anti-plug valve 16 has a cylindrical main body 40 forming a pair of clutch signal outlets 42 and 44 as well as a trio of vent outlets communicating with reservoir 22. It will be understood that all of the separately shown reservoirs 22 are interconnected to provide a closed hydraulic circuit. The ends of the cylindrical body 40 are sealed by identical end caps 52. Each end cap 52 has a main passageway 54 for communicating fluid between the control valve 26 and the anti-plug valve 16. The main passageway 54 is connected to a smaller secondary passageway 56 through an adjustable needle valve 58 which controls the time required to move the valve spool 38 within the anti-plug valve 16 in response to the movement of the shift handle to the desired direction. This provides a means of varying the time delay between the actuation of the shift handle 15 and the engagement of the desired clutch 12 or 14. The valve spool 38 has a main spool section 60 rigidly connected to a pair of spaced secondary spool sections 62 and 64 forming a pair of clutch signal chambers 66 and 68 between the main spool section 60 and the secondary spool sections 62 and 64. These chambers 66 and 68 provide control signals to the clutches 12 and 14. Between the secondary spool sections 62 and 64 and the end caps 52 are formed a pair of control valve signal chambers 70 and 72 to communicate the fluid from the control valve 26 and move the valve spool 38. The main spool section 60 of the valve spool 38 has formed therein a central groove 74 which communicates the fluid from the diverter valve 24 to the reservoir 22 whenever the valve spool 38 is in the balanced neutral state. This is accomplished by aligning the vent outlet 50 and an inlet 76 with the groove 74. This prevents the fluid along line 30 from pressurizing the brake system 17 by way of line 78 and maintains the vehicle in an unbraked condition when the shift handle 15 is in the neutral position.

When the shift handle 15 is moved to indicate a reverse vehicle direction, the fluid from line 28 of the diverter valve 24 is connected to one end of the anti-plug valve 16 through line 34. The opposite end of the anti-plug valve 16 is connected by line 36 to the reservoir 22. This sets up a pressure differential across the anti-plug valve 16 which overcomes the balancing force of springs 80 and causes the valve spool 38 to move to the left. As the valve spool 38 moves, the groove 74 moves from its position aligning the vent outlet 50 with the inlet 76 to effectively block the fluid along line 30 from entering the anti-plug valve 16. The fluid in line 30 is then forced to take the alternate path to the brake system 17 along line 78. To control the actuation of the brake system 17 an adjustable needle valve 81 is placed in line 78. This control is accomplished by the needle valve 81 providing a variable restriction in line 78 which must be overcome before full pressure can be applied to the brake system 17 to actuate the brake system 17. Also connected to line 78 is a relief valve 82 which maintains a predetermined maximum pressure in line 78 by venting the pressurized fluid to reservoir 22 whenever the valve 82 predetermined pressure is exceeded.

The brake system 17 is a conventional system operable either manually by a brake pedal or automatically by a piston 86 connected to line 78. The manual depression of the brake pedal 84 transmits pressurized fluid from a master cylinder 88 to individual vehicle brake cylinders 90 along line 91 to effectively brake the vehicle. In the automatic mode the pressurized fluid from line 78 acts against the piston 86 to pressurize a chamber 92. The pressurized fluid in chamber 92 is transmitted along line 91 to the vehicle wheel cylinders 90 to brake the vehicle.

As the valve spool 38 continues to move to the left, the vehicle reverse clutch 14 is disengaged since the clutch chamber 68 is being vented through the vent outlet 48. As may be best seen with reference to FIG. 2, the clutch 14 is engaged only when the secondary spool section 62 has moved to the left of the clutch signal output 44 to supply the clutch 14 with pressurized fluid from the signal chamber 70. In this position, the secondary spool section 62 blocks the vent outlet 48. The brake system 17 is deactivated when the clutch 14 is supplied with a control signal since a secondary groove 96 now aligns the vent outlet 50 with the inlet 76 to drain the pressurized fluid from the brake system 17 and from the diverter valve 24.

Figure 2:
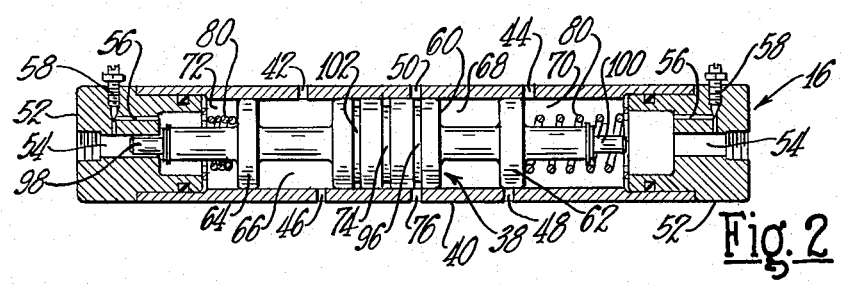
FIG. 2 is a drawing of the anti-plug valve of the FIG. 1 control system with the anti-plug valve positioned to actuate the vehicle transmission.

The time required to move the valve spool 38 from the neutral position shown in FIG. 1 to the outermost position shown in FIG. 2 is controlled by the adjustable needle valve 58 which controls the venting of the signal chamber 72 to reservoir 22. As the valve spool 38 moves to the left, a valve spool extension 98 enters the main passageway 54 to substantially block the flow of fluid therethrough. The movement of the valve spool 38 is now mainly dependent upon the flow through the passageway 56. As the passageway restriction is controlled by the adjustable needle valve 58, the time to vent the chamber 72 and have the valve spool 38 move to the FIG. 2 position is also controlled.

In the FIG. 2 position, the reverse clutch 14 is actuated and the vehicle is proceeding in the reverse direction. When the vehicle operator moves the shift handle directly from the reverse position to the forward position while the vehicle is still in motion, the control system 10 prevents a reversal of the inertial load of the vehicle to be applied to the vehicle drive train. To accomplish this, a delay is effected between engagement of the vehicle transmission by the forward clutch to the forward direction during which delay the vehicle is effectively braked to a speed which will allow a safe transmission shift. Moving the shift handle 15 to the vehicle forward direction will cause the control valve to switch the pressurized fluid from line 28 to line 36 and will connect line 34 to the reservoir 22. This will reverse the pressure differential across the anti-plug valve 16 causing the piston assembly to be driven to the right of its FIG. 2 position. The forward clutch 12 will not be engaged until the valve spool 38 is fully extended to the right and the clutch signal outlet 42 is connected to the signal chamber 72. Until then, the clutch chamber 66 is vented through the vent outlet 46 to prevent any signal from being applied to the clutch outlet 42.

As the valve spool 38 moves to the right, the secondary groove 96 moves out of alignment with the vent outlet 50 and the inlet 76. This causes the brake system 17 to be actuated as was described previously. The brake system 17 remains actuated as the groove 74 in main spool section 60 passes through the position aligning groove 74 with the vent outlet 50 and inlet 76 because of the speed with which the valve spool 38 moves through the neutral FIG. 1 position. This speedy movement results from the complete venting of chamber 70 through both of the right hand passageways 54 and 56. The right side valve spool extension 100 does not enter the passageway 54 until the FIG. 1 neutral position is passed. Further right hand movement of the valve spool 38 is under the control of the right needle valve 58 and progresses in the manner previously described with reference to the left hand movement of the valve spool 38.

When the furthest extension of the valve spool 38 is reached, the vent outlet 50 and the inlet 76 are connected by a secondary groove 102 and the forward clutch 12 is connected to the pressurized control chamber 72. The brake system 17 is disengaged by the venting of the pressurized fluid from lines 30 and 78 to reservoir 22 and the forward direction of the vehicle is actuated by the clutch 12 to move the vehicle forward. During the time required to move the valve spool 38, the vehicle has now been braked to a safe transmission shifting speed. Should the operator now move the shift handle back to reverse vehicle direction, the piston assembly would move to the left in a manner similar to that described for the forward to reverse control shift.

Figure 3:
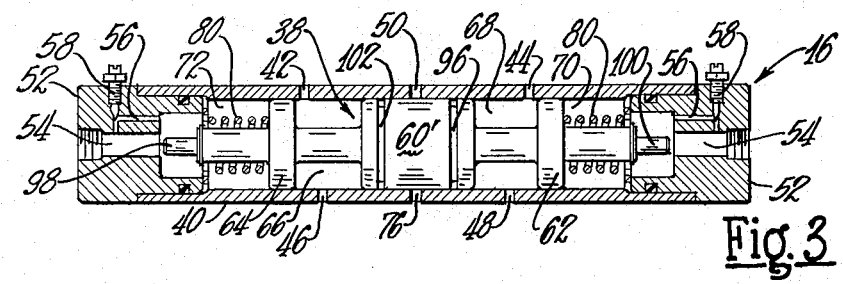
FIG. 3 is a drawing of an alternate embodiment of the anti-plug valve of FIG. 2.

Referring now to FIG. 3, it may be seen that the control system 10 may be modified to have the brake system 17 automatically engage the vehicle brakes when the anti-plug valve 16 is in the neutral position. The vehicle brakes will be released only when the anti-plug valve 16 is in the extreme right or left position in response to the shift control 15 indicating forward or reverse vehicle direction. The control system thus can act as a "hill-holder" or "anti-rollback" or a "parking brake" for the vehicle. To accomplish these objectives, the central groove 74 is eliminated from the main spool section 60 of the valve spool 38. This prevents the pressurized fluid flowing from the diverter valve 24 from being vented to reservoir 22 in the neutral position and the brake system 17 actuated in this position in the manner described earlier.

This modification along with other changes and modifications will become apparent to persons skilled in the art after reading this specification. Therefore these various changes and modifications will not be discussed herein so that the present disclosure may be more concise and readable.

I claim:

1. A control system for automatically engaging a vehicle brake system during a vehicle transmission shift between forward and reverse vehicle direction comprising:

clutch means for engaging a vehicle transmission;

a brake system actuated by a pressure signal applied thereto;

a transmission shift control valve for establishing a control signal in response to a shift in said control valve between actual and desired vehicle direction;

anti-plug means connected to said clutch means, said transmission control valve, and to said brake system for controllably applying said pressure brake signal to said brake system in response to a control signal from said transmission control valve prior to engagement of said clutch means;

said anti-plug means including an anti-plug valve having a cylindrical valve body forming an enclosed annular cavity therein, connecting means for applying the control signal from said transmission control valve to the cavity of said cylindrical valve body, a vent outlet for discharging fluid from the cavity of said cylindrical valve body, and a movable valve spool member sealably located in the cavity of said cylindrical valve body to move in response to the control signal from said transmission control valve between a first position wherein said brake pressure signal is connected to said vent outlet and a second position wherein said brake pressure signal is applied to said brake system; and timing means for varying the time required for said spool member to move from said first position to said second position in response to the control signal from said transmission control valve, said timing means comprising a pair of passageways formed in an end of said cylindrical valve body for communicating the control signal between said connecting means and said movable spool member, a variable restrictor located between said pair of passageways, and a stepped stem member connected to an end of said movable spool member to provide a sequential blocking of at least one of said pair of passageways as said spool member moves in response to the control signal from said transmission control valve.

2. A control system as set forth in claim 1 wherein said spool valve is movable to a third position in contact with the end of the cylindrical body and including a clutch control signal output connected to said clutch means, said spool member communicating the control signal from said transmission shift control valve to said clutch means whenever said spool valve has moved to said third position.

3. A control system for automatically engaging a vehicle brake system during a vehicle transmission shift between forward and reverse vehicle direction comprising:
clutch means for engaging a vehicle transmission;
a brake system actuated by a pressure signal applied thereto;
a transmission shift control valve for establishing a control signal in response to a shift in said control valve between actual and desired vehicle direction;
anti-plug means connected to said clutch means, said transmission control valve, and to said brake system for controllably applying said pressure brake signal to said brake system in response to a control signal from said transmission control valve prior to engagement of said clutch means, said anti-plug means including an anti-plug valve having a cylindrical valve body forming an enclosed annular cavity therein, connecting means for applying the control signal from said transmission control valve to the cavity of said cylindrical valve body, a vent outlet for discharging fluid from the cavity of said cylindrical valve body, and a movable valve spool member sealably located in the cavity of said cylindrical valve body to move in response to the control signal from said transmission control valve between a first position wherein said brake pressure signal is connected to said vent outlet and a second position wherein said brake pressure signal is applied to said brake system;
said spool valve including a central spool section having a pair of grooves formed therein to allow fluid communication around said central spool section, a pair of end spool sections on either side of said central spool section to form a clutch chamber between said central spool section and each of said end spool sections and a control signal chamber between each of said end spool sections and the adjacent end of said cylindrical valve body; and
said connecting means of said anti-plug means conducting the control signal from said transmission shift control valve to one of said control signal chambers and venting the other of said control signal chambers to move said spool valve thereby.

4. A control system as set forth in claim 3 wherein said spool valve is movable to a third position in contact with the end of the cylindrical body and including a clutch control signal output connected to said clutch means, said spool member communicating the control signal from said transmission shift control valve to said clutch means whenever said spool valve has moved to said third position.

5. A control system as set forth in claim 4 wherein one of said pair of grooves of said central spool connects said brake pressure signal to a vent whenever said spool valve moves to said third position.

6. A control system as set forth in claim 5 wherein said central spool section has a third groove formed therein for connecting said brake pressure signal to said vent whenever said spool valve is in said first position.

7. A control system as set forth in claim 6 including spring means for maintaining said spool valve centrally located within said cylindrical body in said first position.

* * * * *

UNITED STATES PATENT AND TRADEMARK OFFICE
CERTIFICATE OF CORRECTION

PATENT NO. : 3,910,389
DATED : Oct. 7, 1975
INVENTOR(S) : Walter J. Pleier

It is certified that error appears in the above-identified patent and that said Letters Patent are hereby corrected as shown below:

Col. 3, line 35: After "fluid" insert ---from the first divider valve outlet---.

Col. 3, lines 36 & 37: After "and" delete ---from the first divider valve outlet---.

Signed and Sealed this seventeenth Day of February 1976

[SEAL]

Attest:

RUTH C. MASON
Attesting Officer

C. MARSHALL DANN
Commissioner of Patents and Trademarks